United States Patent

Maruyama et al.

Patent Number: 5,921,342
Date of Patent: Jul. 13, 1999

[54] POWER ASSISTED STEERING APPARATUS FOR AUTOMOTIVE VEHICLE

[75] Inventors: Tatsuyoshi Maruyama, Atsugi; Norihiro Saita, Isehara; Tadaharu Yokota, Samukawa; Toshinori Aihara, Hadano; Yukio Uchida, Atsugi, all of Japan

[73] Assignee: Unisia Jecs Corporation, Atsugi, Japan

[21] Appl. No.: 08/784,307

[22] Filed: Jan. 16, 1997

[30] Foreign Application Priority Data

Feb. 5, 1996 [JP] Japan ...................................... 8-042098
May 13, 1996 [JP] Japan ...................................... 8-141195

[51] Int. Cl.⁶ ........................................................ B62D 5/06
[52] U.S. Cl. ........................... 180/417; 180/421; 60/418
[58] Field of Search .................................. 180/417, 418, 180/419, 420, 421, 422, 423; 60/413, 418

[56] References Cited

U.S. PATENT DOCUMENTS

| | | | |
|---|---|---|---|
| 4,002,220 | 1/1977 | Wible | 180/421 |
| 4,100,739 | 7/1978 | Shaffer | 60/413 |
| 5,209,317 | 5/1993 | Schnelle | 180/417 |
| 5,271,475 | 12/1993 | Takeshita | 180/79.1 |
| 5,293,952 | 3/1994 | Ledamoisel et al. | 180/417 |

FOREIGN PATENT DOCUMENTS

| | | |
|---|---|---|
| 0 044 733 | 1/1982 | European Pat. Off. . |
| 0 356 408 | 2/1990 | European Pat. Off. . |
| 0 562 426 | 9/1993 | European Pat. Off. . |
| 0 627 353 | 12/1994 | European Pat. Off. . |
| 0 665 157 | 8/1995 | European Pat. Off. . |
| 61-85272 | 4/1986 | Japan . |
| 4-321803 | 11/1992 | Japan . |
| 1 475 250 | 6/1977 | United Kingdom . |

*Primary Examiner*—Kevin Hurley
*Attorney, Agent, or Firm*—Foley & Lardner

[57] ABSTRACT

A power assisted steering apparatus for a vehicle having a driving source, such as an engine, has an actuator, a hydraulic pump, a working oil pressure passage, and a drive switch. The actuator, which is in the vehicle steering mechanism, receives a supply or exhaust of a working oil to assist the steering operation. The pump is selectively driven by an engine via a clutch mechanism. The working oil discharged from the pump is introduced into the actuator via the passage. The check valve is interposed within the passage to enable flow in one direction away from the pump. The drive switch structure is disposed within the passage, downstream from the check valve. With this arrangement, the drive switch structure can be activated by pressure in the passage downstream of the check valve to control the clutch mechanism.

12 Claims, 4 Drawing Sheets

POWER ASSISTED STEERING APPARATUS FOR AUTOMOTIVE VEHICLE

BACKGROUND OF THE INVENTION

The present invention relates to a power assisted steering apparatus that is applicable to an automotive vehicular steering system.

Generally, in order to facilitate a steering operation through a steering wheel with less force, various types of power assisted steering apparatuses in which supply and exhaust of a working oil (hydraulic) into or from a (hydraulic) actuator installed in the vehicular steering system are carried out to achieve a steering assisted power have been used.

A Japanese Patent Application First Publication No. Showa 61-85272 exemplifies one of the previously proposed power assisted steering apparatuses provided with an actuator constituted by a regulating valve and a power cylinder, a hydraulic circuit interposed between an oil pump driven by means of an electric motor and the actuator, an accumulator installed in the hydraulic circuit, a pressure sensor arranged for detecting a hydraulic pressure in the hydraulic circuit, a controller arranged for receiving a detection signal from the pressure sensor and controlling a drive or stop of the motor according to the received detection signal.

In the disclosed vehicular power assisted steering apparatus, when the pressure sensor detects a reduction in the hydraulic pressure in the hydraulic circuit, the working oil is accumulated into the accumulator so that, during an abrupt steering operation, an inconvenience for a discharge oil quantity to become insufficient can be eliminated because of its rise characteristic of the hydraulic pump in a start operation.

However, in the previously proposed power assisted steering apparatus disclosed in the above-identified Japanese Patent Application First Publication, the hydraulic pump for the working oil is driven and rotated by means of the electric motor so that, in the automotive vehicle in which an internal combustion engine is mounted, a driving energy of the engine is not only reduced according to a working efficiency of the motor but also is reduced according to a generation efficiency of the motor but also is reduced according to a generation efficiency of an engine alternator. Consequently, an energy loss may become large. In addition, since the electrical power consumption of the motor is generally large so that the energy consumption, i.e., the fuel consumption of the engine may accordingly be worsened.

In addition, a remaining pressure in a hydraulic circuit (working oil pressure passage) held by means of an accumulator is maintained at a predetermined pressure determined according to a capacity of the accumulator. In other words, in a state wherein the variable capacity pump discharges the working oil pressure, the accumulator always accumulates the working oil until the accumulated working oil has reached to a maximum capacity that the accumulator has (the maximum capacity depends on a maximum pressure and maximum volume of the accumulator).

Anyway, an energy that requires in the actuator during a steering operation is determined according to a predetermined working oil pressure based on a regulation of a regulating valve of the actuator and a stroke variable of the power cylinder that the actuator has. Hence, suppose that the power cylinder is operated according to the energy accumulated in the accumulator. In a case where the power cylinder strokes at a relatively short distance with a working oil pressure equal to a maximum pressure in the accumulator, the energy accumulated in the accumulator is efficiently utilized. On the contrary, in a case where only a small steering assistance force is required and the power cylinder strokes at a relatively long distance with the working oil pressure smaller than the maximum pressure of the accumulator, the energy accumulated in the accumulator is not effectively utilized.

In other words, although the accumulator is always driven to accumulate the working oil pressure up to the maximum volume thereof, the power cylinder is not always operated with the maximum working pressure. When the power cylinder is required to provide a relatively small steering assistance force, the working pressure of the power cylinder of the actuator may be small. In this case, the accumulation energy of the accumulator may be small. That is to say, when the power cylinder of the accumulator requires only a small working pressure, the variable capacity pump consumes wastefully the energy since an extremely larger energy than the working pressure is accumulated in the accumulator.

It is noted that, in the previously proposed power assisted steering apparatus, in order to avoid a wasteful power consumption if the maximum pressure is accumulated in the accumulator, a sufficient steering assistance force required during a start of the steering operation through a steering wheel of the vehicle cannot be obtained if grounding resistances of road wheels of the vehicle are large. Hence, it is logically possible for the maximum pressure that the accumulator has to be reduced without limitation.

SUMMARY OF THE INVENTION

It is an object of the present invention to provide a power assisted steering apparatus for an automotive vehicle which achieve a circulation of a working oil into a drain passage so as to suppress a temperature rise in the working oil and achieve a superior durability in the apparatus.

According to one aspect of the present invention, there is provided with a power assisted steering apparatus for a vehicle having a driving source, comprising:

a) an actuator installed in a steering mechanism of the vehicle so as to receive a supply or exhaust of a working oil to derive a power assisting a steering operation derived through a steering wheel;

b) a hydraulic pump arranged so as to be driven and rotated according to the driving source;

c) a working oil pressure passage arranged so that the working oil discharged from the hydraulic pump is introduced into the actuator;

d) a check valve interposed within said working oil pressure passage for enabling a flow of the working oil from said hydraulic pump to the actuator but for blocking a reverse flow of the working oil from said actuator to said hydraulic pump; and e) a drive switch structure disposed within a part of the working oil pressure passage located downstream with respect to said check valve so as to be driven on the basis of at least a pressure within the part of the working oil pressure passage, which is downstream with respect to the check valve.

DESCRIPTION OF THE PREFERRED EMBODIMENTS

Reference will hereinafter be made to the drawings in order to facilitate a better understanding of the present invention.

(First Embodiment)

Figure 1:
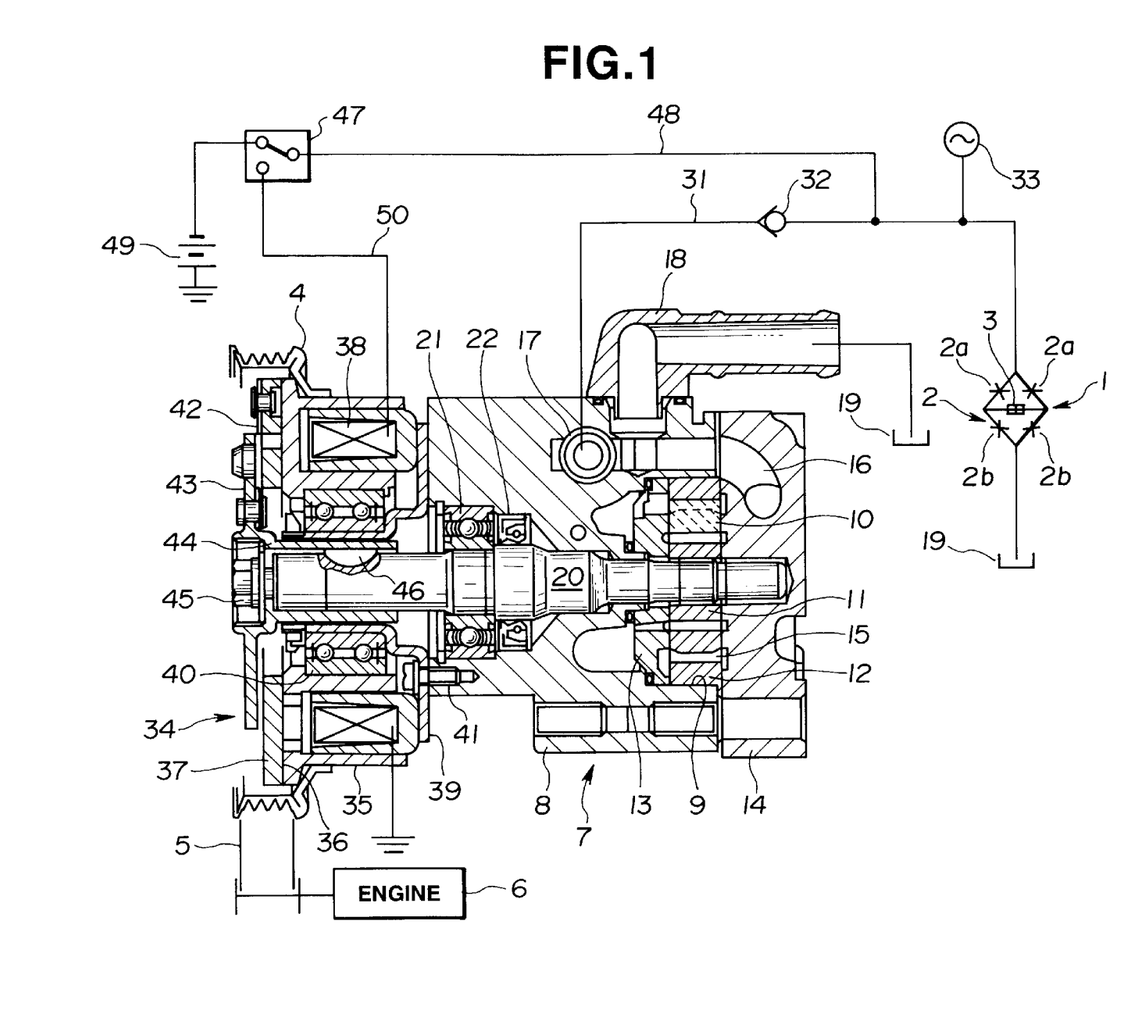
FIG. 1 is a schematic electric-and-hydraulic circuit wiring diagram of a power assisted steering apparatus in a first preferred embodiment according to the present invention.

FIG. 1 shows a first preferred embodiment of a power assisted steering apparatus according to the present invention.

An actuator 1 of the power assisted steering apparatus includes: a regulating valve 2 of a center close type and a power cylinder 3.

The regulating valve 2 includes normally closed valves 2a installed in an internal of a working oil pressure passage (hydraulic circuit) and normally opened valves 2b installed in an internal of a drain passage as will be described later.

A pulley 4 as the driving source is linked to the internal combustion pulley 4 via a belt 5 so that the engine is always driven and rotated thereby.

A hydraulic pump 7 is rotated and driven by means of the pulley 4, which serves as the driving source. The hydraulic pump 7, in the first embodiment, includes the cam ring 12 housing a rotor on which a plurality of vanes 10 are attached approximately radially within a recess of a pump housing so as to enable putting forward or rearward and a side plate 13. A covering plate 14 encloses an opening of the recess 9 of the pump housing 8.

The hydraulic pump (vane pump) 7 includes pump chambers 15 formed between the mutually adjoining vanes 10. The pump chamber 15 has its volume varied according to a rotation of the rotor 11 so that the variation causes an absorbing interval to be formed at a part at which the volume is increased and causes a draining interval to be formed at a part at which the volume is decreased.

An absorbing passage 16 is communicated with the absorbing interval of the pump chamber 15. A flow quantity regulating valve 17 serves to circulate a part of the working oil introduced from a draining passage (not shown) communicated with the draining interval of the pump chamber 15 so as to regulate a drained flow quantity of the working oil discharged from the hydraulic pump 7. A suction pipe 18 is attached to the pump housing 8, communicating the absorbing passage 16 and a reservoir (tank) 19.

A drive axle 20 is linked to the rotor 11 so as to drive the rotor 11, a bearing 21 is arranged between the drive axle 11 and the pump housing 8. In addition, 22 denotes a seal member 22.

A hydraulic passage 31 introduces the discharged working oil of the hydraulic pump 7 into the actuator 1 so that the flow quantity regulated by means of the flow quantity regulating valve 17 is introduced into the hydraulic passage 31.

A check valve 32 is interposed in a midway through the hydraulic passage 31 for enabling the flow of the working fluid from the hydraulic pump 7 into the actuator 1 and for blocking the reverse flow of the working oil from the actuator 1 to the hydraulic pump 7. Furthermore, an accumulator 33 is installed on the part of the hydraulic passage 31, which is downstream with respect to the check valve 32, so as to be enabled to maintain the pressure within the hydraulic passage 31 at a predetermined value of pressure.

An electromagnetic clutch 34 is installed between the pulley 4 and the hydraulic pump 7. The electromagnetic clutch 34 includes a rotor 35 integrally linked to the pulley, an armature disposed so as to face against a frictional surface 36 and linked to the drive axle 20, and an electromagnetic coil 38 that serves to force the armature 37 to the frictional surface 36 of the rotor 35.

The rotor 35 has its cross section in a laterally tilted letter of U shape and the whole shape of the rotor 35 gives an approximately ring shape. The pulley 4 is fixed onto the outer periphery of the rotor 35 and its inner periphery of the rotor 35 is fixed to the holder 39 via the bearing 40, the holder 39 being pivotally linked to the holder via the pump housing 8. A bolt 41 serves to fix the holder 39 to the pump housing 8. The armature 37 is formed of a flat plate shape and is interposed with a slight gap against the frictional surface 36 of the rotor 35 and its peripheral end is linked to a drive plate 43 via a flexible strape plate 42. An inner peripheral base 44 of the drive plate 43 is fixed with respect to the drive axle 20 by means of a bolt 45 and a key 46 so that the drive plate 43 does not rotate relative to the axle 20.

A dual pressure responsive switch 47 monitors a pressure within the part of the working oil passage 31 (hydraulic passage), which is downstream with respect to the check valve 32, through a detection coil passage 48 so as to control a clutching or disengaging of the electromagnetic clutch 34 according to its monitored pressure.

That is to say, the pressure responsive switch 47 is installed in a midway through a power supply circuit 50 to form a power supply 49 to the electromagnetic coil 38. When the pressure within the hydraulic passage 31, introduced into the detection coil passage 48, is higher than the predetermined value, the supply of the energizing current to the electromagnetic coil 38 is interrupted by the opening of the power supply circuit 50.

The pressure responsive switch 47 regulates the electric supply to the electromagnetic coil 38 so as to control the clutching and/or disengaging of the electromagnetic clutch 34.

It is noted that the end of the power supply circuit 50, namely, one end of the power supply 49 and the one end of the electromagnetic coil are grounded.

Next, an operation of the power assisted steering apparatus in the first embodiment will be described below.

The pulley 4 as the driving source is always rotated and driven via the belt 5 by means of the internal combustion engine 6 and the rotor 35 fixed to the pulley 4 is also rotated and driven.

In this state, when the pressure within the part of the hydraulic passage 31, which is downstream with respect to the check valve 32, is lower than the predetermined value, the pressure responsive switch 47 closes the power supply circuit 50 to supply the energizing current from the (DC) power supply 49 to the electromagnetic coil 38.

Thus, the armature 37 is attracted to engage onto the frictional surface 36 of the rotating rotor 35, so that the electromagnetic clutch 34 becomes engaged. Consequently, the driving force from the pulley 4 is transmitted to the drive axle 20 via the rotor 35, the armature 37, the strap plate 42, and the drive plate 43. Then, the hydraulic pump 7 is driven and rotated.

The hydraulic pump 7 is rotated and driven so that after the working oil is sucked into the pump chamber 15 in the absorbing interval from the reservoir 19 via the suction pipe 18 and absorbing passage 16.

Thereafter, the sucked working oil is introduced from the pump chamber 15 in the draining interval into the hydraulic passage 31 via the flow quantity regulating valve 17 into the hydraulic passage 31.

The working oil discharged into the hydraulic passage 31 is introduced into the accumulator 33 and the actuator 1 via the check valve 32.

The working oil introduced into the actuator 1 is consumed in order to exhibit suitably a steering assistance force during the steering operation when the steering assistance force is required.

In details, the regulating valve 2 of the actuator 1 includes the normally closed valves 2a disposed at the upstream position with respect to the actuator 1 and the normally open valves 2b disposed at the downstream position with respect to the actuator 1. The regulating valve 2 is selectively opened or closed by means of a controller (not shown) or torsion bar mechanism so that the power cylinder 3 is selectively driven and the actuator 1 is operated. Consequently, the working oil introduced into the actuator 1 is consumed in order to exhibit suitably the steering assistance force when the steering assistance force is required.

In a state wherein the working oil is discharged from the hydraulic pump 7, the steering assistance force is not required and the actuator 1 is transferred from the operation state into the non-operation state, the working oil quantity consumed in the actuator 1 is gradually decreased to finally zero.

Hence, the working oil discharged from the hydraulic pump 7 is supplied to the accumulator 33 and is accumulated into the accumulator 33. The accumulator 33 holds the pressure within the part of the passage 31, which is downstream with respect to the check valve 32, during the operation of the actuator 1.

Hence, the working oil discharged from the hydraulic pump 7 is supplied to the accumulator 33 and is accumulated into the accumulator 33. The accumulator 33 holds the pressure within the part of the hydraulic passage 31, which is downstream with respect to the check valve 32, during the non-operation of the actuator at the predetermined value of pressure.

When the pressure within the part of the hydraulic passage 31, which is downstream with respect to the check valve 32, reaches to the predetermined pressure, the pressure responsive switch 47 introduced via the detection oil passage 48 is operated so that the supply of the energizing current to the electromagnetic coil 38 is interrupted with the power supply circuit 50 opened, disengaging the armature 37 from the electromagnetic coil 38 is halted so that the connection of the electromagnetic clutch 34 is released. Consequently, the rotation of the pulley 4 as the driving source is continued and the drive of the hydraulic pump 7 is halted.

In the state wherein the drive of the hydraulic pump 7 is not carried out, the supply of the working oil to the hydraulic pump 31 from the hydraulic pump 7 is not carried out but the part of the hydraulic passage 31, which is downstream with respect to the check valve 32, serves to interrupt the communication to the upstream side of the check valve 32. And, the pressure at this part is held at the predetermined pressure value by the application of the pressure application force by means of the accumulator 33. Hence, during the abrupt steering operation, the part of the hydraulic passage 31, which is downstream with respect to the check valve 32, and the working oil accumulated into the accumulator 33 is supplied to the actuator 1 quickly. Thus, the smooth steering assistance force operation can be achieved.

When the energy accumulated into the accumulator 33 according to the operation of the actuator 1 is consumed and the pressure within the hydraulic passage 31, which is located at the downstream position with respect to the check valve 32, is lower than the predetermined value, the pressure responsive switch 47, which detects the pressure within the hydraulic passage 31, is operated so that the electromagnetic clutch 34 is engaged so that the hydraulic pump 7 is driven and rotated.

Hence, in the power assisted steering apparatus of the first embodiment, the electromagnetic clutch 34 is engaged or disengaged according to the pressure within the hydraulic passage 31 so as to control the drive or stop of the hydraulic pump 7. In details, the pressure responsive switch 47 causes the engagement of the electromagnetic clutch 34 to drive the hydraulic pump 7 due to the pressure reduction of the hydraulic passage 31. Because the hydraulic pump 7 is not always driven, the present steering apparatus saves energy. In addition, when the working oil pressure is accumulated into the accumulator 33 the inconvenience due to the insufficient discharge quantity caused by the rising characteristic of the hydraulic pump 7 during the start of the hydraulic pump 7 can be eliminated.

In addition, the electromagnetic clutch 34 is engaged and/or disengaged according to the pressure within the oil pressure (hydraulic) passage 31 and the drive or stop of the hydraulic pump 7 is controlled so that the drive of the hydraulic pump 7 without use of the motor can be controlled. Since the power consumption of the electromagnetic clutch 34 is relatively small as compared with that of the electric motor, the power assisted steering apparatus with less energy loss and less power consumption can be achieved.

The hydraulic pump 7 may be constituted by one of various types of the pump except the vane pump.

Although the pressure responsive switch 47 constitutes the direction control over the power supply of the electromagnetic coil 38, a relay controlled by means of the pressure responsive switch may be interposed into the power supply circuit 50. This relay can control the power supply to the electromagnetic coil 38.

(Second Embodiment)

Figure 2:
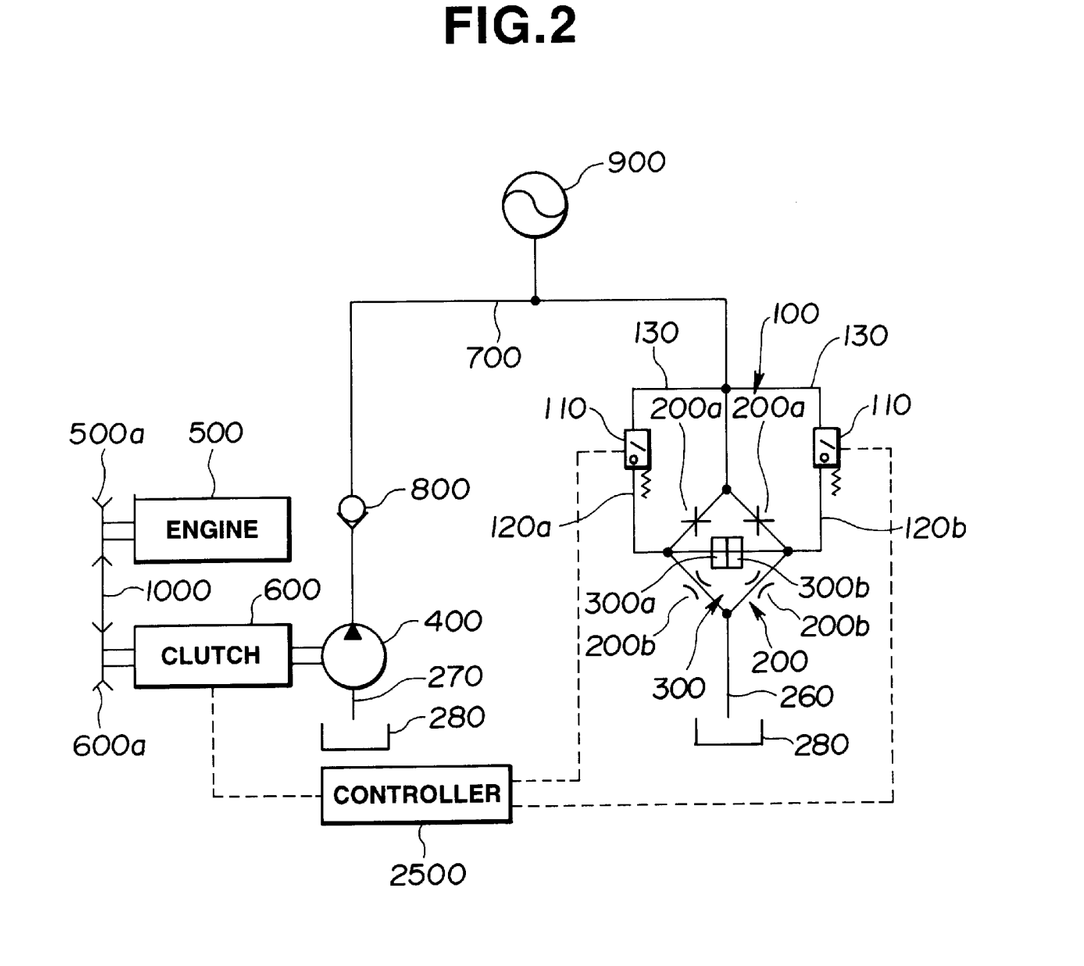
FIG. 2 is a schematic electric-and-hydraulic circuit wiring diagram of the power assisted steering apparatus in a second preferred embodiment according to the present invention.

FIG. 2 shows an explanatory view of a second first preferred embodiment of a power steering apparatus according to the present invention.

In FIG. 2, the actuator 100 includes the regulating valve 200 of the center close type having normally closed valves 200a located at the working oil pressure passage side as will be described later and normally opened valves 200b located at the draining passage side as will be described later, and the power cylinder 300 having a pair of working oil cylinders 300a and 300b.

The hydraulic pump 400 is driven by means of the internal combustion engine 500 as the driving source via the electromagnetic clutch 600. The working oil pressure passage 700 introduces the working oil discharged from the hydraulic pump 400 into the actuator 100, the check valve 800 serving to allow the flow of the working oil from the hydraulic pump 400 into the actuator 100 and to block the reverse flow of the working oil from the actuator 100 to the hydraulic pump 400.

The accumulator 900 is enabled to maintain the pressure within the working oil pressure passage 700 at the predetermined value of pressure.

The switching operation of one of the pressure responsive switches 110 is carried out.

In addition, the working oil pressure (PCb) within the working oil chamber 300b is introduced via the passage 120b and the oil pressure (PA) within the working oil pressure circuit 700 is introduced via the passage 130.

According to the pressure difference between the hydraulic pressure (PCb) and the oil pressure (PA), the switching operation of the other of the pressure responsive switches 110 is carried out.

A power transmitting belt 1000 is wrapped around the pulley 600a of the pulley 500a and the electromagnetic clutch 600 of the engine 500. The driving force of the engine 500 is transmitted to the hydraulic pump 400 via the electromagnetic clutch 600.

The pressure responsive switch 110 is installed in the pair of working oil chambers 300a and 300b of the power cylinder 300, respectively.

These pressure responsive switch 110 are disposed so as to correspond to the pair of working oil chambers 300a and 300b, respectively.

These pressure responsive switches 110 receives the working oil pressure within the working oil chamber 300a or within the working oil chamber 300b in which the pressure variation occurs according to a rightward steering operation or according to a leftward steering operation and the working oil pressure within the part of the working oil passage 700, which is downstream with respect to the check valve 800, and switches to turn on or off according to a pressure difference between these oil pressures.

In details, in one of the pressure responsive switches 110 corresponding to the one of the pair of working oil chambers 300a, the working oil chamber 300a is introduced via the passage 120a and the oil pressure (PA) within the working oil pressure passage 700 is introduced via the passage 130.

According to the pressure difference between the working oil pressure (PCa) and the working oil pressure (PA), the switching operation of the corresponding pressure responsive switch is carried out.

A power transmitting belt 1000 is wrapped around the pulley 600a of the pulley 500a and the electromagnetic clutch 600 of the engine 500.

The driving force of the engine 500 is transmitted to the hydraulic pump 400 via the electromagnetic clutch 600.

The pressure responsive switch 110 is installed in the pair of working oil chambers 300a and 300b of the power cylinder 300, respectively.

These pressure responsive switches 110 are disposed so as to correspond to the pair of working oil chambers 300a and 300b, respectively.

These pressure responsive switches 110 receive the working oil pressure within the working oil chamber 300a or within the working oil chamber 300b in which the pressure variation occurs according to a rightward steering operation or according to a leftward steering operation and the working oil pressure within the part of the working oil passage 700, which is downstream with respect to the check valve 800, and switches to turn on or off according to a pressure difference between these oil pressures.

In details, in one of the pressure responsive switches 110 corresponding to the one of the pair of working oil chambers 300a, the working oil pressure (PCa) within the working oil chamber 300a is introduced via the passage 120a and the oil pressure (PA) within the working oil pressure passage 700 is introduced via the passage 130.

According to the pressure difference between the working oil pressure (PCa) and the working oil pressure (PA), the switching operation of the corresponding pressure responsive switch 110 is carried out.

Figure 3:
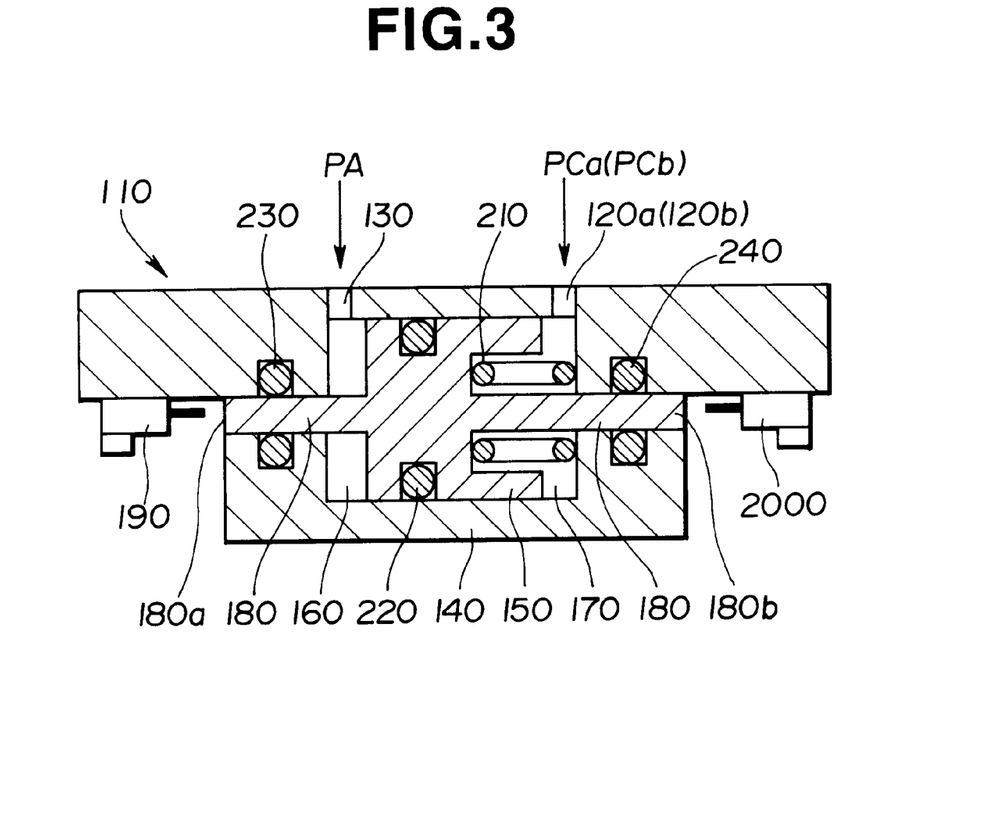
FIG. 3 is a cross sectional view of a pressure responsive switch used in the power assisted steering apparatus shown in FIG. 2.

The pressure responsive switch 110 is constructed as shown in FIG. 3.

That is to say, the piston 150 is slidably inserted into the cylinder 140 so that an inside of the cylinder 140 is partitioned into a first pressure chamber 160 and a second pressure chamber 170. The oil pressure within the part of the working oil pressure passage 700, which is downstream with respect to the check valve 800, is introduced into the first pressure chamber 160 and the working oil pressure within either the working oil pressure chamber 170 is introduced into either the working oil chamber 300a or the working oil chamber 300b, which is downstream with respect to the check valve 800.

In addition, a pair of limit switches 190 and 2000 are disposed on both ends of the cylinder 140 operable by ends 180a and 180b of the piston rod 180 so the ends 180a and 180 b of the piston rod 180 extend beyond the chamber 160 and 170 so that the piston rod 180, which is integrated to the piston 150 can penetrate sealingly through both ends of the cylinder 140.

A spring 210 is installed within the second pressure chamber 170 for biasing the piston 150 toward the first pressure chamber 160.

A seal ring 220 is disposed on a body side of the piston 150 and a pair of seal rings 230 and 240 serve to execute liquid tight sealings of the piston rod 180.

The switch signal from the pressure responsive switch 110 is introduced into the electromagnetic clutch 600 via the regulator (controller) 2500 so that the electromagnetic clutch 600 is regulated to control the hydraulic pump 400.

The draining passage 260 serves to introduce the working oil from the actuator 100, the suction passage 270 serves to introduce the working oil to the hydraulic pump 400, and the reference numeral 280 denotes the reservoir (tank).

The hydraulic pump 400 is always driven in response to the drive of the internal combustion engine 600. The hydraulic pump 400 sucks the working oil via the suction passage 270 from the reservoir (tank) 280 via the suction passage 270 into the working oil pressure passage 700. The working oil discharged into the working oil pressure passage 700 is introduced into the actuator 100 via the check valve 800. The working oil introduced to the actuator 100 is consumed in order to exhibit suitably the steering assistance force during the operation of the actuator 100 requiring the steering assistance force. That is to say, in the regulating valve 2000 of the actuator 100, the normally closed valves 200a are disposed in the working oil pressure passage 700 at the upstream positions with respect to the power cylinder 300 and the normally opened valves 200b are disposed in the drain passage 180 at the downstream positions.

When the regulating valve 200 is selectively opened or closed, the working oil is selectively supplied or drained to or from the pair of working oil chambers 300a and 300b of the power cylinder 300. Consequently, the working oil introduced from the actuator 100 is consumed to exhibit suitably the steering assistance force.

In the state wherein the working oil is discharged from the hydraulic pump 400, when the steering assistance force is not required and the actuator 100 is transferred from the operation state to the non-operation state, the working oil quantity consumed by the actuator 100 is gradually reduced and is finally reduced to zero so that a part or whole discharged oil from the hydraulic pump 400 is supplied from the part of the working oil pressure passage 700, which is downstream to the check valve 800, and is accumulated in the accumulator 900.

Hence, the accumulator 900 holds the pressure within the part of the working oil pressure passage 700, which is downstream with respect to the check valve 800, at a predetermined pressure during the non-operation of the actuator 100. A minimum value of the pressure held by the accumulator 900 is determined according to a spring force of a spring 210 housed in the second pressure chamber 170 of each of the pressure responsive switches 110 for biasing the piston 150.

At this time, the working oil under the predetermined pressure (PA) within the part of the working oil pressure passage 700, which is downstream with respect to the check valve 800, is introduced into the passage 130. On the other hand, since the actuator 100 is not operated, the working oil pressure of the power cylinder 300, namely, the working oil pressure (PC) within the working oil chamber 300a or working oil chamber 300b is under the low pressure or is reduced to zero and the reduced or zeroed working oil pressure is introduced into the second pressure chamber 17 of the pressure responsive switch 110.

Hence, the oil pressure (PA) introduced within the first regulating oil chamber 160 is overwhelmed so that the piston 150 is moved toward the second pressure chamber 170 against the spring force of the spring 210 so that the end 180b of the piston rod 180 operates the limit switch 2000.

The switching signal of the limit switch 2000 regulates the electromagnetic clutch 6 via a controller 2500 so as to release the engagement of the electromagnetic clutch 600. Hence, the operation of the hydraulic pump 400 is halted. In other words, when a difference in pressure between the oil pressure (PA) within the working oil pressure passage 7 and the working oil pressure (PC) of the power cylinder 300 is greater than the predetermined value, the operation of the hydraulic pump 400 is halted (OFF) (refer to FIG. 4).

In the state wherein the operation of the hydraulic pump 400 is halted, the supply of the working oil from the hydraulic pump 400 is not carried out. However, the communication of the part of the working oil pressure passage 700, which is downstream with respect to the check valve 800, with the part of the working oil pressure passage 700 which is upstream with respect to the check valve 800, is interrupted so that a pressure application force is given to be held at the predetermined pressure.

Consequently, during the abrupt steering operation, the working oil accumulated into the part of the working oil pressure passage 700, which is downstream with respect to the check valve 800, and accumulated into the accumulator 900 is supplied quickly into the accumulator 100. Consequently, the smooth steering assistance operation can be achieved.

The energy stored in the accumulator 900 is consumed due to the operation of the power cylinder 300 of the actuator 100.

When the pressure (PA) within the part of the working oil passage, which is downstream with respect to the check valve 800, is reduced, the pressure within the part of the first pressure chamber 16 of the pressure responsive switch 110 into which the working oil pressure within the working oil pressure passage 700 is introduced is reduced so as to become approximately equal to the pressure within the second pressure chamber 170 into which the working oil (PC) of the power cylinder 300 is introduced. Hence, the spring force of the spring 210 for biasing the piston 150 of the pressure responsive switch 110 is overwhelmed over the reduced pressure within each of the first and second pressure chambers 160 and 170 so that the spring force causes the piston 150 to be moved toward the first pressure chamber 160, the limit switch 190 being operated upon a tip 180a of the piston rod 150.

It is noted that the signal derived from the limit switch 190 regulates the electromagnetic clutch 600 via the regulator 2500 so as to connect to the electromagnetic clutch 600, thus the hydraulic pump 400 being driven. That is to say, the pressure responsive switch 110 turns on the hydraulic pump 400 when the pressure difference between the working oil (PA) within the working oil pressure passage and the working oil pressure (PC) of the power cylinder is lower than the predetermined value (refer to FIG. 4).

Therefore, the hydraulic pump 400 supplies the working oil to the working oil to the working oil pressure passage 700 and to the actuator 100 until the pressure difference between the oil pressure (PA) within the working oil pressure passage 700 and the working oil pressure (PC) of the power cylinder 300 reaches to a value equal to or larger than the predetermined value.

The working oil discharged from the hydraulic pump 400 and supplied to the actuator 100 exhibits suitably the steering assistance force.

That is to say, the hydraulic pump 400 is driven when the difference in pressure between the working oil pressure (PA) within the working oil pressure passage 700 and the working oil pressure (PC) in the actuator 100 is lower than the predetermined value. The working oil under the required hydraulic pressure according to the working pressure of the power cylinder 300, namely, the working oil under a high oil pressure higher than the working pressure in the power cylinder 300 by the value corresponding to the spring force of the spring 210 is discharged into the working pressure passage 700 and is supplied to the pressure cylinder 300.

In details, the hydraulic pump 400 is stopped when the pressure difference (PA–PC) is larger than the predetermined value.

Hence, when the varying member 500 of the hydraulic pump 400 is operated according to the working oil pressure of the power cylinder 300 in the actuator 100, the working oil accumulated in the accumulator 900 is the working oil higher than the spring force of the regulating spring 210 by the value corresponding to the spring force of the control spring 210.

This working oil is immediately supplied to the actuator 100. Conventionally, it is not necessary to hold the pressure within the working oil pressure passage 100 at a high pressure regardless of the working pressure. Accordingly, the energy loss can be reduced and the power steering apparatus with a high working efficiency can be achieved.

(Third Embodiment)

Figure 5:
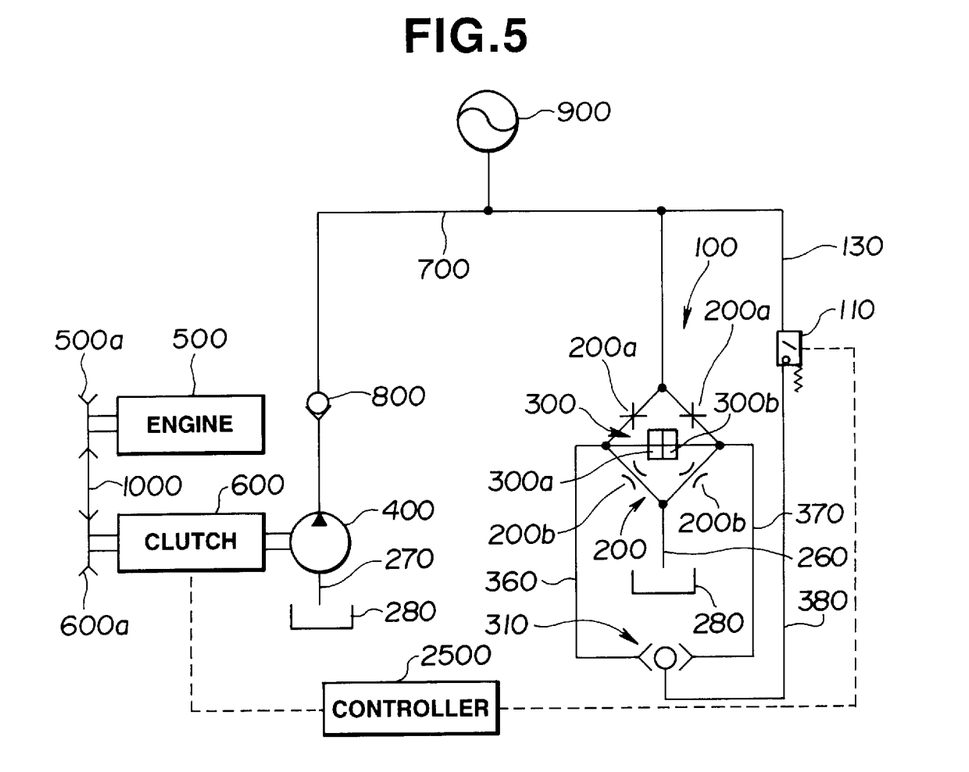
FIG. 5 is a schematic electric-and-hydraulic circuit wiring diagram of the power steering apparatus in a third preferred embodiment according to the present invention.

FIG. 5 shows a third preferred embodiment of the power assisted steering apparatus according to the present invention.

In the third embodiment, a pressure selecting valve 310 is interposed between the pair of working oil chambers 300a and 300b for selecting one of the pressures within the working oil chamber 300a and the working oil chamber 300b, which is higher than the other as the working oil pressure of the power cylinder 300. The selected working oil pressure of the power cylinder 300 is introduced into the pressure responsive switch 110.

Figure 6:
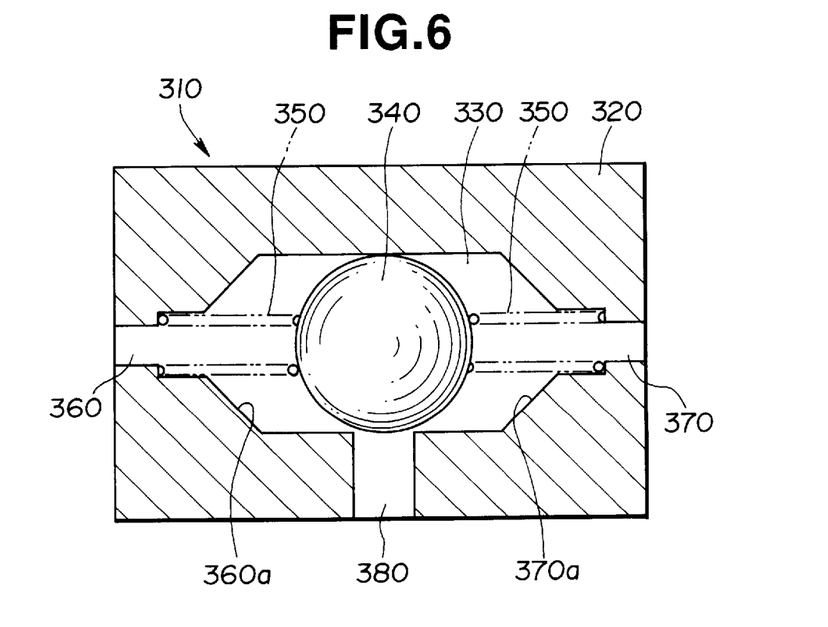
FIG. 6 is a cross sectional view of a pressure selecting valve used in the third embodiment shown in FIG. 5.

The pressure selecting valve 310 is typically shown in FIG. 6.

That is to say, a valve chamber 330 is formed within a casing 320, a ball valve 340 and a pair of check springs 350 which bias the ball valve 340 from both sides thereof, are housed in the valve chamber 330. On the other hand, a passage 360 is opened on a left side of the valve chamber 330, which communicates to a left side oil chamber 330a of the power cylinder 300 and a passage 370 is opened on a right side of the valve chamber 330 of the power cylinder 300, which communicates to a right side of the valve chamber 330. Furthermore, a passage 380 is opened on a center of the valve chamber 330, which communicates with the second pressure chamber 170 of the pressure responsive switch 110. Valve seats 360a and 370a for the ball valve 340 are formed at opening ends of the valve seat 330 of the passages 360 and 370. In addition, the size of the openings of the valve chamber sides 330 of the passage 380 is formed with a dimension so that the ball valve 340 does not close communication with the passage 380 when 340 is at its neutral position (FIG. 6).

Figure 4:
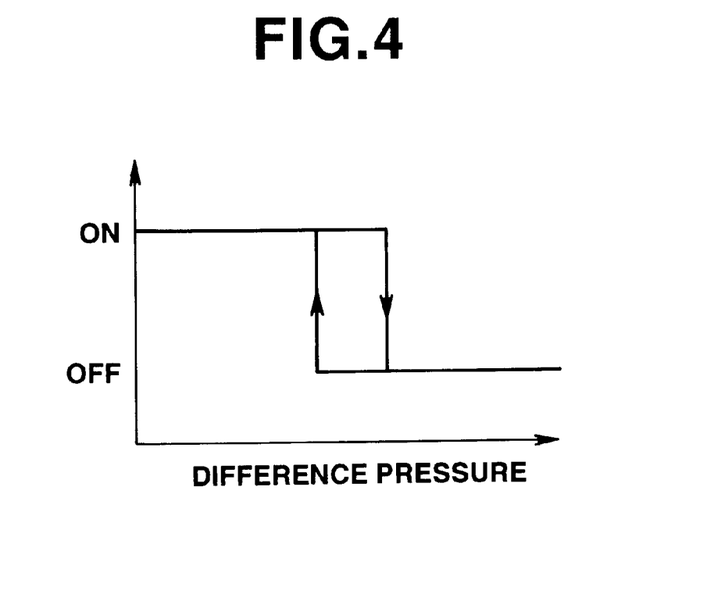
FIG. 4 is a characteristic graph representing a pressure difference responsive characteristic in the pressure responsive switch shown in FIG. 3.

Since the other individual structures of the power assisted steering apparatus in the third embodiment are the same as those in the second embodiment shown in FIGS. 2 to 4, the detailed explanation thereof will be omitted here.

In the third embodiment, when the actuator 100 is operated so that, for example, the pressure within the left side working oil chamber 300a of the power cylinder 300 is high and the pressure within the right side working oil chamber 300b is low, the working pressure (PA) within the left side working oil chamber 300a of the power cylinder 300 is introduced into the valve chamber 330 of the pressure selecting valve 310 via the passage 360 so that the ball valve 340 interrupts the communication between the passages 370 and 380, contacting against the valve seat 370a, i.e., interrupts the communication of the pressure responsive switch 110 with the right side working oil chamber 300b of the power cylinder 300. At this time, since the communication between the valve chamber 330 and the passage 360 is continued, the working pressure within the left side working oil chamber 300a of the power cylinder 300 is introduced into the second regulating oil chamber 170 of the pressure responsive switch 110 via the passage 360, the valve chamber 330 and the passage 380.

This causes the pressure responsive switch 110 the drive or stop of the hydraulic pump 400 according to the pressure difference between the hydraulic pressure (PA) within the working oil pressure passage 700 and the working oil pressure passage (PC, one of the pressures within the pair of the working oil chambers 300a and 300b, which is higher than the other) of the power cylinder 300 selected by the pressure selecting valve 310.

Hence, in the third embodiment, in addition to the achievement of the same advantage and effect as the second embodiment, the pressure responsive switch 110 can be reduced to a single pressure responsive switch.

As an alternative of the third embodiment, the electromagnetic clutch 600 may be eliminated but the pressure responsive switch 110 may control the electric motor installed for driving the hydraulic pump and, thus, the operation of the hydraulic pump 400 may be regulated by the motor.

What is claimed is:

1. A power assisted steering apparatus for a vehicle having an internal combustion engine and a steering mechanism, comprising:

a driving source driven by the internal combustion engine;

an actuator for receiving a supply or exhaust of a working oil to power assist a steering operation of the steering mechanism;

a hydraulic pump;

a clutch mechanism interposed between the hydraulic pump and the driving source for selectively driving the hydraulic pump;

a working oil pressure passage connecting the hydraulic pump and the actuator for supplying the working oil discharged from the hydraulic pump to the actuator;

a check valve interposed in the working oil pressure passage for enabling a flow in one direction from the hydraulic pump to the actuator; and an accumulator connected to the working oil pressure passage downstream of the check valve.

2. A power assisted steering apparatus as claimed in claim 1, wherein the clutch mechanism comprises a pressure responsive switch connected to the oil pressure passage downstream of the check valve and switchable between a plurality of switch positions based on the pressure in the oil pressure passage downstream of the check valve, the clutch mechanism selectively operating to drive the hydraulic pump based on the switch position of the pressure responsive switch.

3. A power assisted steering apparatus as claimed in claim 2, wherein the pressure responsive switch responds to the pressure in the accumulator to control the hydraulic pump.

4. A power assisted steering apparatus as claimed in claim 3, wherein said clutch mechanism engages the driving source and the hydraulic pump when the pressure in the working oil pressure passage downstream of the check valve is below a predetermined pressure at which the accumulator holds to drive the hydraulic pump.

5. A power assisted steering apparatus as claimed in claim 4, wherein the working oil discharged from the hydraulic pump is supplied to the actuator and the accumulator until the pressure of the working oil in the accumulator reaches the predetermined pressure.

6. A power assisted steering apparatus as claimed in claim 4, wherein when the pressure within the accumulator reaches the predetermined pressure, the clutch mechanism disengages the driving source and the hydraulic pump to stop the hydraulic pump.

7. A power assisted steering apparatus as claimed in claim 6, wherein the clutch mechanism comprises an electromagnetic clutch.

8. A power assisted steering apparatus as claimed in claim 6, wherein the clutch mechanism comprises a hydraulic clutch.

9. A power assisted steering apparatus as claimed in claim 7, wherein the driving source comprises the internal combustion engine and a pulley driven by the engine, which pulley is connected to the electromagnetic clutch.

10. A power assisted steering apparatus as claimed in claim 2, wherein the actuator comprises a power cylinder having a pair of working oil pressure chambers and a regulating valve for regulating the supply or exhaust of the working oil to or from the pair of the working oil chambers, and wherein the pressure responsive switch is switchable between the plurality of switch positions based on a difference in pressure between the working oil pressure passage downstream of the check valve and the working oil pressure in the power cylinder, the hydraulic pump being regulated based on the switched position of the pressure responsive switch.

11. A power assisted steering apparatus for a vehicle having a driving source as claimed in claim 10, wherein the pressure responsive switch is provided for each of the pair of working oil chambers of the power cylinder.

12. A power assisted steering apparatus for a vehicle having a driving source as claimed in claim 11, further including a pressure selecting valve arranged between the pair of the working oil chambers of the power cylinder for selecting a higher pressure of the pair of the working oil chambers as the working oil pressure of the power cylinder, the higher working oil pressure of the power cylinder being introduced to the pressure responsive switch.

\* \* \* \* \*